United States Patent [19]
Barak

[11] 3,994,279
[45] Nov. 30, 1976

[54] SOLAR COLLECTOR WITH IMPROVED THERMAL CONCENTRATION

[75] Inventor: Amitzur Z. Barak, Chicago, Ill.

[73] Assignee: The United States of America as represented by the United States Energy Research and Development Administration, Washington, D.C.

[22] Filed: July 24, 1975

[21] Appl. No.: 598,972

[52] U.S. Cl. .............................. 126/271; 126/270
[51] Int. Cl.² ............................................ F24J 3/02
[58] Field of Search ............ 122/271, 270; 237/1 A

[56] References Cited
UNITED STATES PATENTS

| | | | |
|---|---|---|---|
| 3,321,012 | 5/1967 | Hervey | 126/271 |
| 3,847,136 | 11/1974 | Salvail | 126/271 |
| 3,868,823 | 5/1975 | Russell, Jr. | 126/270 |
| 3,915,148 | 10/1975 | Fletcher | 126/271 |

Primary Examiner—Kenneth W. Sprague
Attorney, Agent, or Firm—Dean E. Carlson; Arthur A. Churm; Paul A. Gottlieb

[57] ABSTRACT

Reduced heat loss from the absorbing surface of the energy receiver of a cylindrical radiant energy collector is achieved by providing individual, insulated, cooling tubes for adjacent parallel longitudinal segments of the receiver. Control means allow fluid for removing heat absorbed by the tubes to flow only in those tubes upon which energy is then being directed by the reflective wall of the collector.

3 Claims, 5 Drawing Figures

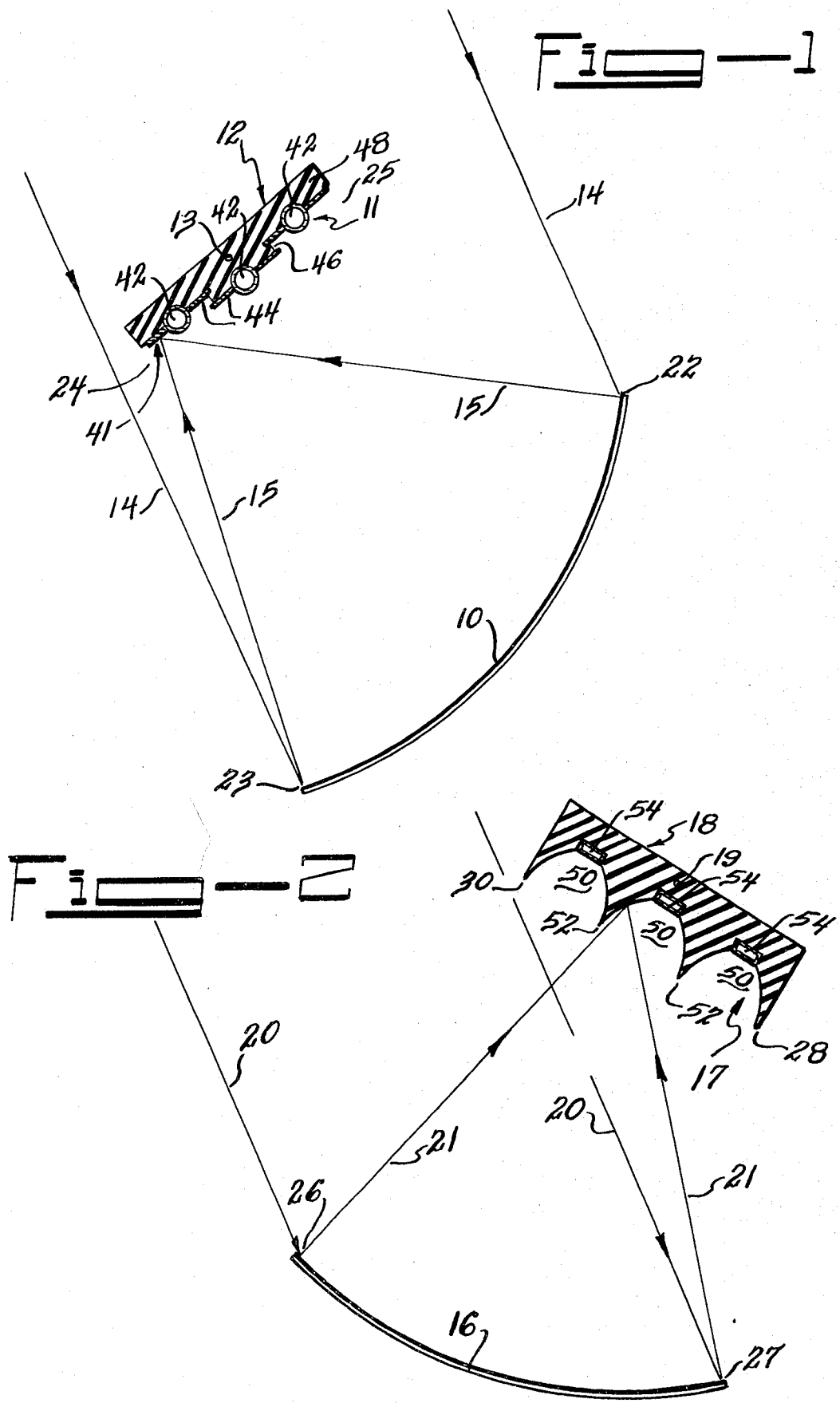

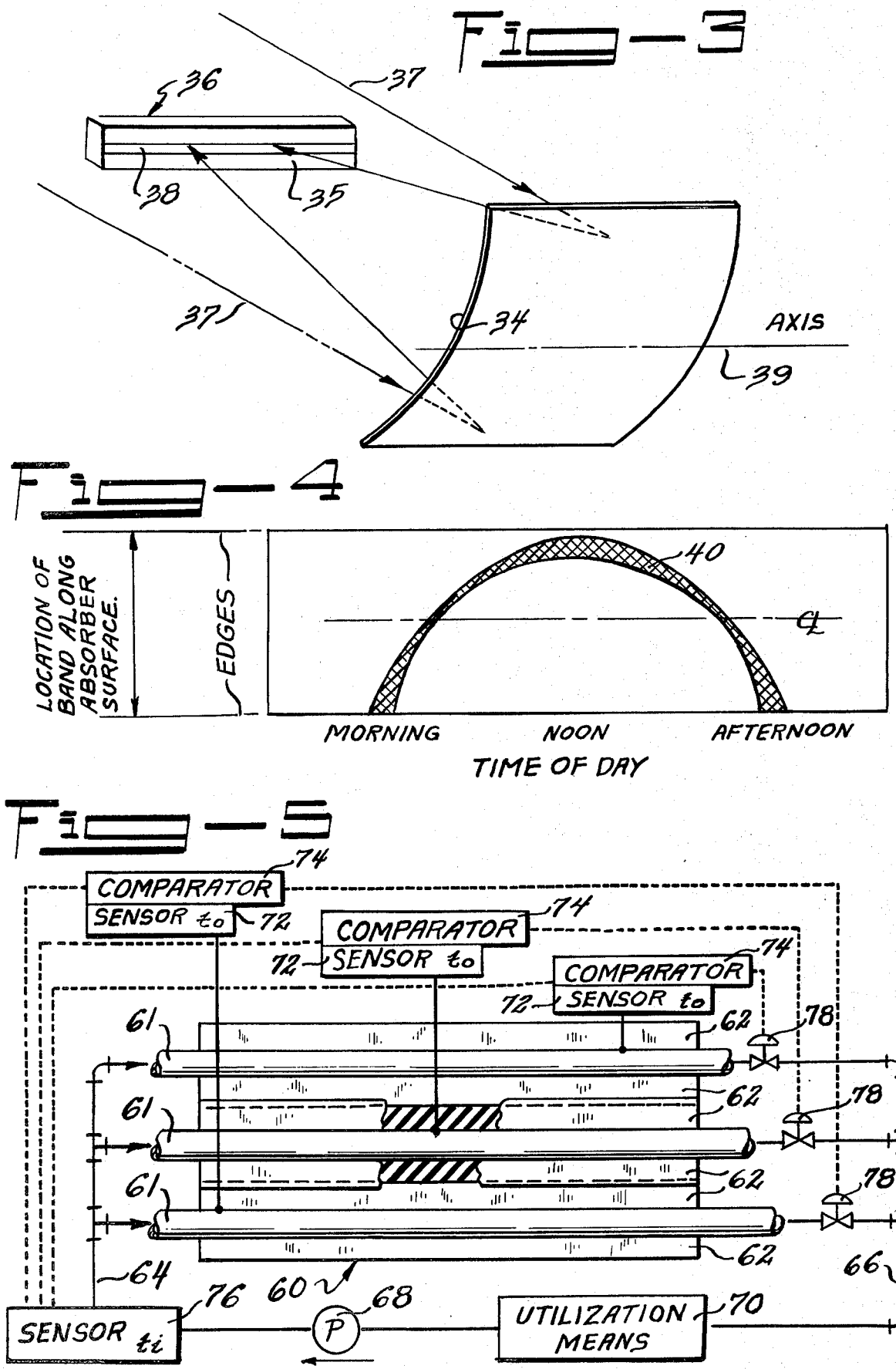

SOLAR COLLECTOR WITH IMPROVED THERMAL CONCENTRATION

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

Cylindrical radiant energy collectors are trough-like structures which concentrate incident radiant energy. The structure usually includes as a concentration means a reflecting wall or walls, or a lens. The wall or walls are formed by extending a given cross section along a longitudinal axis perpendicular to the cross section. They direct and concentrate, usually by reflection, incident energy onto a heat absorbing surface of an energy receiver. The absorber surface may be a duct with a coolant or a group of thermally interconnected ducts. Radiant energy directed onto the ducts is absorbed as heat by the ducts and is removed by the fluid made to flow through the ducts by pumping means, such as a pump or thermosiphon. In those cylindrical collectors where only a portion of the heat absorbing surface has energy directed upon it, at a particular instance, rather than having all of the heat absorbing surface of the absorber having energy directed thereupon, inefficiency results from heat losses from those hot receiver surfaces which do not have radiation directed thereon and therefore which do not absorb radiation. Heat flows to those surfaces by conduction through the metal receiver from those surfaces which do absorb radiation due to the thermal interconnected nature of the receiver, and by convection from the hot fluid circulating through heated and unheated portions of the receiver, since in practice the fluid even before removing heat from the receiver is hotter than the environment.

These problems are particularly evident in cylindrical imaging solar radiant energy collectors with an essentially parabolic reflecting wall. Such a collector is advantageous in that it requires no diurnal tracking. With solar rays coplanar with the axis plane about which the parabola defining the parabolic reflecting wall is symmetric, the image, i.e. the envelope of radiant energy directed by the reflecting wall and falling on the absorbing surface of the receiver positioned at the focus of the parabolic reflecting wall parallel to the longitudinal axis, is a very narrow strip or band. This image moves across the absorbing surface during the hours of solar radiation collection, so that only a portion of the absorbing surface is heated at any instant. With prior art cylindrical imaging collectors with a parabolic reflecting wall the absorbing surface is usually a single pipe or a group of side-by-side contacting pipes. Efficiency is degraded by the losses due to radiation and convection from those portions of the absorbing surface upon which the image is nonincident and from pumping fluid through those portions of the absorbing surface upon which the image is nonincident.

It is therefore an object of this invention to improve the efficiency of cylindrical radiant energy collectors.

Another object of this invention is to improve the efficiency of cylindrical imaging collectors with an essentially parabolic reflecting wall.

Another object of this invention is to reduce radiant heat loss from unheated portions of the absorbing surface of the energy receiver of a cylindrical radiant energy collector.

Another object of this invention is to control coolant flow through the energy receiver of a cylindrical radiant energy collector by limiting coolant flow to heated portions of the absorbing surface of the energy receiver of a cylindrical radiant energy collector.

SUMMARY OF THE INVENTION

In a cylindrical radiant energy collector there is provided a means for reducing heat loss from unheated portions of the energy receiver and for limiting unnecessary flow of coolant to unheated portions of the energy receiver. The receiver is provided with a plurality of coolant tubes positioned one adjacent to another but not thermally interconnected, extending the length of the receiver of the trough-like collector. At any given time of energy collection a band of energy will be directed onto a portion of the receiver by the reflecting wall or reflecting walls of the collector. Means are provided for sensing which tubes the band is incident upon at any particular time and for allowing coolant to flow only in those tubes heated by the band while preventing coolant flow in those tubes not heated by the band. The tubes are insulated from each other to limit heat conduction from heated tubes to unheated tubes. Sensing may be done by monitoring the temperature of the coolant present in the tubes to that with the temperature of the coolant in a tube at a particular level, coolant is caused to flow in the tube, while with coolant temperature in the tube not above the particular level the coolant is prevented from flowing in the tube. This device is particularly useful in cylindrical imaging energy collectors having a single parabolic reflecting wall.

BRIEF DESCRIPTION OF THE DRAWINGS

FIG. 1 is a transverse cross section of an embodiment of the device;

FIG. 2 is a transverse cross section of another embodiment of the device;

FIG. 3 shows the trough-like structure of the collector;

FIG. 4 is a chart showing the position of the radiant energy image band on the absorbing surface of the receiver of the collector with respect to time; and FIG. 5 shows apparatus for controlling the flow of coolant in the coolant tubes of an energy receiver according to this invention.

DETAILED DESCRIPTION OF THE INVENTION

Referring to FIG. 1 and FIG. 2, there is shown the transverse cross sections of cylindrical imaging radiant energy collectors, each with an essentially parabolic reflecting wall. The cylindrical collector is a trough-like device whose structure is formed by extending the cross sections shown in FIG. 1 and FIG. 2 along an axis perpendicular to the plane of the cross section to form a trough-like structure, as will be described with reference to FIG. 3. The function of the collector is to concentrate radiant energy incident on the parabolic reflecting wall onto the heat absorbing surface of an energy receiver positioned at the focus of the parabolic wall.

In FIG. 1, the parabolic reflector 10 directs energy onto the heat absorbing surface 11 of energy receiver 12 which is positioned approximately at the focus 13 of parabolic reflector 10, with the axis of symmetry of the parabola generally passing through the center of receiver 12. For example, solar rays 14 are directed along lines 15 to receiver 12. In FIG. 2, the parabolic reflecting wall 16 directs incident radiant energy onto the heat absorbing surface 17 of energy receiver 18 which is positioned approximately at the focus 19 of parabolic reflecting wall 16. For example, solar rays 20 are directed along lines 21 to receiver 18. Here the section of the parabola, which constitutes the reflector 16, is not symmetrical and does not include the apex of the parabola, allowing the receiver 18 to be positioned so that it does not shade or interfere with the incoming radiant energy rays. The shape of the curve of the reflecting walls 10 and 16 and the position of receivers 12 and 18 is more particularly described in a publication by Tabor entitled "Stationary Mirror Systems for Solar Collectors" appearing in *Solar Energy*, Vol. II, No. 3–4, July-October 1958, pages 27–33.

In particular, in FIG. 1, the end points 22 and 23 of parabolic reflecting wall 10, the focus 13 and the end points 24 and 25 of absorbing surface 11 all fall on a single circle. In FIG. 2, the end points 26 and 27 of parabolic reflecting wall 16, the focus 19 and the end points 28 and 30 of surface 17 all fall on a single circle. Referring to FIG. 3, there is shown the trough-like structure of a cylindrical imaging radiant energy collector. Radiant energy is directed by parabolic reflecting wall 34 onto the heat absorbing surface 35 of receiver 36, located near the parabolic focus. Such a cylindrical imaging reflector is characterized by the condition that solar rays, such as rays 37, are directed by the parabolic reflecting wall 34 onto a very narrow strip or band 38 on the absorbing surface 35. The band 38 extends the length of receiver 36 parallel to the longitudinal axis 39. Because of this confinement of the directed energy to narrow band 38, the collector is said to be an imagng collector. No diurnal tracking is required of the cylindrical imaging collector with a parabolic reflecting wall. The daily change in declination altitude and azimuth of the sun causes the image or narrow band 38 to move across the absorbing surface 35, as is illustrated in FIG. 3.

FIG. 4 illustrates the changing position of the band. In FIG. 4, the shaded region of curve 40 conforms to that portion of absorbing surface 35 upon which band 38 is incident due to direction of radiant energy by reflecting wall 34. In FIG. 4, the motion is generally centered about the center line of absorbing surface 35 parallel to axis 39. This will occur each day only if the proper tilt of the parabolic wall 34 is provided for by some external means not shown in any of the figures. Such tilting is well known and corrects for the position of the sun with respect to the change of season at a particular latitude. As can be seen from FIG. 4, only a portion of the face of the absorber has radiant energy incident thereon at any particular instance. With prior art absorbers with a single face or thermally interconnected faces, heat is radiated and lost from the unradiated portions of the absorbing surface due to the thermal interconnection of the absorber surface and to hot fluid flowing through the unradiated portions. Further unnecessary pumping inefficiency results from causing fluid flow in unradiating portions. The present disclosure provides a device for eliminating this unneeded cooling and for reducing heat loss.

In FIG. 1, the absorber 12 is divided into long, narrow, parallel segments 41 which extend along the length of the longitudinal axis of the collector, parallel to the reflected band of energy from parabolic reflecting wall 10. Each segment 41 includes a coolant tube 42 through which a coolant flows to remove heat absorbed by the segment. Reduced size of tubes to conserve material and for other advantages is optionally provided by utilizing fins 44 to extend the length of the segment to the desired width. These segments 41 are double insulated from each other. First they are spaced apart and preferably staggered with gaps 46 between each segment to prevent metallic contact and therefore to prevent heat conduction between each segment. Secondly, as will be described, coolant flow in tube 42 is limited to those segments 41 upon which the band of reflected energy from parabolic reflector 10 is actually incident. Thus the heat removal fluid in tube 42 will not be transferring any heat over a large coolant tube area such as is the case with prior art cooling schemes, thereby limiting the surface area from which heat may be lost from absorbing surface 11. Insulation 48 may be provided to limit radiation loss from the unheated surface of each segment 41. Segments 41 may overlap to insure that all of the energy directed by reflecting wall 10 is incident on a segment 41.

In FIG. 2, there is also shown a receiver 18 whose absorbing surface 17 is divided into segments 50. Here, however, secondary concentration means 52 are provided to further concentrate the concentrated energy directed by the parabolic reflecting wall 16 and to provide significant separation of the segments to reduce heat conduction between the segments. Such secondary concentration means would also be in the form of a cylindrical collector but of a nonimaging type such as described in a publication, *Solar Energy*, Vol. 16, No. 2, pages 89–95, (1974) and in a prior U.S. application for Radiant Energy Collector, Ser. No. 492,074, filed July 25, 1974. At the exit aperture of each secondary concentrator 52 is an absorber tube 54, here shown rectangular in shape, which has a coolant fluid for removing heat absorbed by the tube 54.

The best number of segments to divide a heat absorbing surface into is always at least two of more, and is determined by optimization. The variables for optimization are the actual shape of the parabolic reflecting wall, the distance of the receiver from the collector, the number of segments, and the width of each segment which does not have to be equal for all segments. Generally, the higher the number of segments, the less the heat loss, but the more expensive and complicated is the absorber. Further, the shape of the face of the absorber to be heated is not necessarily planar but could be curved so that allowance may have to be made in the shape of each segment. The average surface area of the absorber surface covered by the radiated band for the hours of collection is less than 20%. For example, a typical reflecting wall might be 6.7 feet wide, 50 feet long and 1 foot deep with a receiver 1 foot wide. The maximum width of the radiated band for a planar absorbing surface would be about 2.1 inches, and a five segment absorbing surface is acceptable.

Referring to FIG. 5, there is shown a device for controlling the flow of fluid in the absorber tubes 42 and 54 of the receivers shown in FIG. 1 and FIG. 2 to reduce convective heat loss from the unheated segments of the receiver. In FIG. 5, there is shown an absorber surface 60 divided into three segments with an absorber tube 61 in each segment. Typically, the absorber tubes 61 would be of a high heat conductive material. The tubes may be of less width than the width of each segment with heat conductive fins 62 coupled to the tubes to extend the coverage to the remaining width of the segment. The use of fins 62 and reduced size tubes 61 has several advantages. First, there is less tube material area, reducing cost, and allowing in some cases a cheaper material to be used for fins rather than making the entire structure of a more costly corrosion-resistant material. Second, small tubes allow desirable coolant flow rates in tubes 61 such as to enable turbulence rather than laminar flow, with higher heat transfer and possibly less pumping force than with larger tubes. Finally, since less surface area of tubes 61 is in contact with the coolant, the corrosion problem is reduced. The tubes 61 are coupled in parallel with a single header 64 and a single output tube 66. Flow is maintained by pump 68 and any heat absorbed by the coolant is utilized by utilization means 70. The band of directed energy, being incident upon a particular segment, manifests itself by the rise in temperature of the coolant in that segment. Each tube 61 is therefore provided with a temperature sensor 72 to monitor the temperature $t_o$ of the coolant in the tube. The value obtained by sensor 72 is compared by comparator 74 with the inlet temperature $t_i$ of header 64 obtained by temperature sensor 76. If the temperature $t_o$ is greater than $t_i$, then comparator 74 operates valve 78 to allow coolant to be pumped through that tube. If $t_o$ is less than or equal to $t_i$, then valve 78 is closed, preventing coolant flow. Each tube 61 is provided with its own sensor, comparator, and valve so each segment is provided with individual flow control. $t_o$ could also be compared with a predetermined value of $t_i$, removing the necessity for an input sensor 76. Individual flow control of the coolant flowing in each tube limits unnecessary pumping of coolant to unheated segments. Good results are obtained with the sensors 72 positioned closer to output tube 66 than to header 64 to obtain the greatest $t_o$. Also, the starting and stopping of pumping at the beginning and end of the day will be controlled by the device.

While the invention has been described in detail with respect to cylindrical imaging collectors with parabolic reflecting walls, it is not limited to this form. Any cylindrical collector wherein timewise uneven heat distribution over the surface of the absorber occurs, with an extended band portion of the absorbing surface radiated and another portion unradiated, can utilize the teaching of this invention to reduce radiated heat loss and necessary pumping. For example, the invention might be utilized with a lens concentrator or with the reflecting arrangement of the collector described in a publication by R. F. Stengel appearing in *Design News*, Jan. 6, 1975, at page 30, entitled "Solar Energy Concentrator Moves Focus, Not Mirrors." It has been determined that with 6½ hours a day on solstice of available radiant energy collection the thermal concentration which is defined as the ratio between the net reflector area, normal to the solar rays, to the daily average heat emitting area of the receiver can be increased to about 14 or 15 without secondary concentration, and even more, that is to above 20, with the secondary concentration as shown in FIG. 2.

The embodiments of the invention in which an exclusive property or privilege is claimed are defined as follows:

1. In a cylindrical imaging, solar, radiant energy collector including an energy receiver and a parabolic wall for concentrating radiant energy onto the energy receiver positioned near the focus of the wall, the receiver and the wall extending parallel to a reference axis so that the absorbing surface of the energy receiver upon which radiant energy is directed is in the form of a band defined by two opposite sides parallel to the reference axis, the band of varying dimension and varying position on the surface of the receiver depending upon the time of day and time of year, the improvement in the energy receiver for reducing heat loss from the collector, comprising: a plurality of nonimaging, cylindrical, radiant energy concentrators positioned on the surface of the receiver extending the length of the receiver parallel to the reference axis and aligned to receive energy directed by the parabolic wall so that the band will fall on at least one of the concentrators during desired times of radiant energy collection, a plurality of coolant tubes each positioned at the exit aperture of one of said cylindrical concentrators and thereby being separated from the other tubes limiting heat conduction therebetween, each of said tubes containing a coolant fluid for removing heat absorbed by said tubes, pump means coupled to said tubes for causing said fluid to flow therethrough, means coupled to each of said tubes for controlling the flow of fluids therethrough so with the band incident on a particular concentrator, the tube of said particular concentrator is allowed to have a fluid flowing therethrough and without the band falling on the particular concentrator fluid is prevented from flowing in the tube of said particular concentrator, and means coupled to said tubes for utilizing heat removed by the fluid allowed to flow through said tubes.

2. The energy receiver of claim 1 wherein said heat absorbers are separated from each other, thereby limiting heat conduction therebetween.

3. The receiver of claim 2 further including a header, and an outlet conduit, said coolant tubes being coupled in parallel between said header and said conduit so that fluid enters said coolant tubes from said header and exits said coolant tubes into said conduit, and wherein said means for controlling the flow includes a plurality of first temperature sensors, each of said first sensors being coupled to one of said coolant tubes and developing a temperature signal proportional to the temperature of the coolant tube to which said sensor is coupled, a second temperature sensor coupled to said header for developing an inlet signal proportional to the temperature of said fluid entering said coolant tubes, a plurality of comparators each being coupled to one of said first temperature sensors and said second temperature sensor and being responsive to the temperature signal of said first sensor to which said comparator is coupled being greater than said inlet signal to develop an open flow signal, and a plurality of valve means each being coupled to one of said comparators and the coolant tube associated with said one of said comparators, said valve means being responsive to said open flow signal developed by the comparator coupled to said valve means to allow fluid to flow through said associated coolant tube.

* * * * *